(12) United States Patent
Desta

(10) Patent No.: US 6,225,720 B1
(45) Date of Patent: May 1, 2001

(54) SELF-LUBRICATING BEARING

(75) Inventor: Girma G. Desta, Richfield, MN (US)

(73) Assignee: Wood Group ESP, Inc., Oklahoma City, OK (US)

( * ) Notice: Subject to any disclaimer, the term of this patent is extended or adjusted under 35 U.S.C. 154(b) by 0 days.

(21) Appl. No.: 09/440,897

(22) Filed: Nov. 16, 1999

(51) Int. Cl.[7] .............................. H02K 7/08; F16C 33/66
(52) U.S. Cl. .......................... 310/90; 384/291; 384/398; 384/286
(58) Field of Search .................... 310/87, 90; 384/97, 384/107, 112, 123, 275, 291, 368, 276

(56) References Cited

U.S. PATENT DOCUMENTS

| | | | |
|---|---|---|---|
| 56,624 | 7/1866 | Sherman | 384/286 |
| 389,185 | 9/1888 | Aldrich | 384/286 |
| 390,590 | 10/1888 | Griswold | 384/291 |
| 1,377,866 | * 5/1921 | White | 384/291 |
| 1,485,985 | 3/1924 | Jones | 384/286 |
| 2,163,090 | 6/1939 | Harry | 384/291 |
| 4,105,267 | 8/1978 | Mori | 384/291 |
| 4,342,491 | 8/1982 | Jamison et al. | 384/286 |
| 4,521,708 | 6/1985 | Vandevier | 310/87 |
| 4,810,105 | * 3/1989 | Arlott et al. | 384/97 |
| 5,128,573 | 7/1992 | Liu et al. | 310/87 |
| 6,109,790 | * 8/2000 | von Gynz-Rekowski et al. | 384/97 |

* cited by examiner

*Primary Examiner*—Nestor Ramirez
*Assistant Examiner*—Judson H. Jones
(74) *Attorney, Agent, or Firm*—McAfee & Taft (57) ABSTRACT

A self-lubricating bearing for use in submersible oil-filled motors is disclosed. The bearing comprises a bearing housing and is fixed against rotation. A bearing sleeve is disposed in the bearing housing. The bearing sleeve is fixed in the bearing housing, and has a slot disposed therethrough. The bearing housing has an inlet and an outlet defined therethrough that intersect the slot in the bearing sleeve. The bearing is disposed about a rotatable shaft in the motor. Rotation of the shaft will cause oil to be drawn in through the inlet so that the shaft and the bearing surface of the bearing sleeve are lubricated. Rotation will also cause oil drawn in through the inlet to be expelled through the outlet back into the motor so that there is a constant circulation of oil through the bearing to provide lubrication.

23 Claims, 6 Drawing Sheets

FIG. 3 ced in the motor. The rotor bearing will engage the stator so that as the shaft extending through the motor rotates, the rotor bearing is fixed against rotation. The bearing has an inner surface and an outer surface, and has first and second ports extending through the bearing from the outer surface to the inner surface thereof A groove is defined in the inner surface of the bearing, and preferably extends around about 180° of the inner diameter of the bearing. The first and second ports comprise an inlet and an outlet, which provide for the intake of the oil from the motor housing through the bearing and the discharge of oil from the interior of the bearing into the motor housing. Oil is therefore communicated through the bearing to the inner or bearing surface of the bearing to lubricate the shaft, or a shaft sleeve keyed to the shaft, as the shaft rotates in the bearing.

SELF-LUBRICATING BEARING

BACKGROUND OF THE INVENTION

This invention relates to a self-lubricating bearing for oil-filled machines, and more particularly to a rotor bearing for use in submersible oil-filled motors.

Submersible pumps are typically centrifugal pumps that are driven by submersible motors which rotate a shaft extending from the motor to the pump. Motors utilized to drive such pumps for oil and water production may vary in length from approximately six to over thirty feet in length. Such motors typically have a stator secured within a tubular outer housing and a rotor secured to the shaft which rotates within the stator.

Because of the length of the motor, rotors are generally made up of a number of rotor sections that may comprise a large number of flat disks, or laminations, that are secured to one another and to the shaft in any way known in the art. For example, the rotors may be keyed to the shaft and have retaining rings at the upper and lower ends thereof to prevent axial movement. The rotor sections are spaced apart longitudinally from one another in the motor. Rotor bearings are utilized in the motor to stabilize the shaft, and are typically located between rotor sections and at the upper and lower ends of the rotor. The rotor bearing generally includes a bearing housing having a sleeve disposed therein. The bearing housing is adapted to engage the inner wall of the stator to prevent rotation of the bearing housing in the motor, and the sleeve is in most instances keyed to the shaft so that the sleeve will rotate with the shaft inside the bearing housing. The bearings must be lubricated so as to prevent overheating and/or premature failure. Therefore, shafts in such motors are typically hollow tubular shafts with axial bores therethrough. The axial bore extends upwardly from the lower end of the shaft and is plugged at the top. A radial port will extend through the shaft and the bearing sleeve at each bearing location and will intersect the axial bore so that oil can be communicated from the axial bore in the shaft to be inner surface of the bearing housing to lubricate the sleeve rotating therein. While such a configuration works adequately, reliable lubrication of bearings is a concern. There is some question as to whether the oil is adequately distributed, so that the bearings at the top of the motor receive the same amount of oil as those near the bottom, and whether or not such bearings are adequately lubricated. Furthermore, if the axial bore or one of the radial bores becomes plugged one or more bearings may receive restricted oil flow, or no flow at all, which will cause overheating and failure. Bearings that become worn must be replaced, which is time-consuming and costly. There is therefore a need for an apparatus which can create a reliable, constant oil flow rate through a rotor bearing which will allow the bearing to run cooler and which will allow for a longer bearing life.

SUMMARY OF THE INVENTION

The present invention meets the foregoing needs by providing a self-lubricating rotor bearing. The rotor bearing is configured to allow a high oil flow rate through the bearing to lubricate the bearing surface so that the bearing runs cooler and has a longer life than prior art rotor bearings. The rotor bearing of the present invention may be used in machines that are at least partially filled with oil and are specifically adapted for use in oil-filled, submersible motors used in the production of water and/or oil from a wellbore.

The bearing is adapted to be disposed in an oil-filled motor housing and to be fixed to a stator that has been The bearing of the present invention preferably comprises an outer housing, which may be referred to as a bearing housing, and an inner or bearing sleeve. The outer surface of the bearing is defined on the bearing housing, and the inner surface of the bearing is defined on the bearing sleeve. The bearing sleeve is a generally cylindrical sleeve having a slot defined therethrough extending around a portion of the periphery thereof The slot preferably extends through at least about 180° and defines the groove in the inner surface of the bearing. The first and second ports extending through the bearing from the outer surface thereof to the inner surface thereof intersect the slot. The first and second ports therefore define a flow path through the bearing. Rotation of the shaft will cause oil from the motor housing to be drawn into the bearing through one of the first or second ports to provide lubrication to the bearing surface so that the shaft extending therethrough can rotate freely. A continuous flow of oil is provided since the oil drawn in through one port will be expelled through the other of the ports thus allowing the bearing to run cooler and last longer than prior art bearings.

The bearing housing is preferably generally cylindrically shaped with a pair of notches defined in the outer surface thereof The first and second ports intersect the notches and have first and second longitudinal axes respectively. The first and second longitudinal axes of the first and second ports are preferably parallel to one another. The notches defined in the outer surface of the bearing create oil reservoirs in the motor housing adjacent the first and second ports so that a constant supply of oil to lubricate the bearing is readily available and so that a reservoir is readily available for oil discharged from the bearing.

The bearing of the present invention thus meets a number of needs and provides a number of advantages over the prior art bearings. These and other objects and advantages of the present invention will become apparent after studying the detailed description of the invention in view of the accompanying drawings and appended claims.

DETAILED DESCRIPTION OF A PREFERRED EMBODIMENT

Figure 1A:
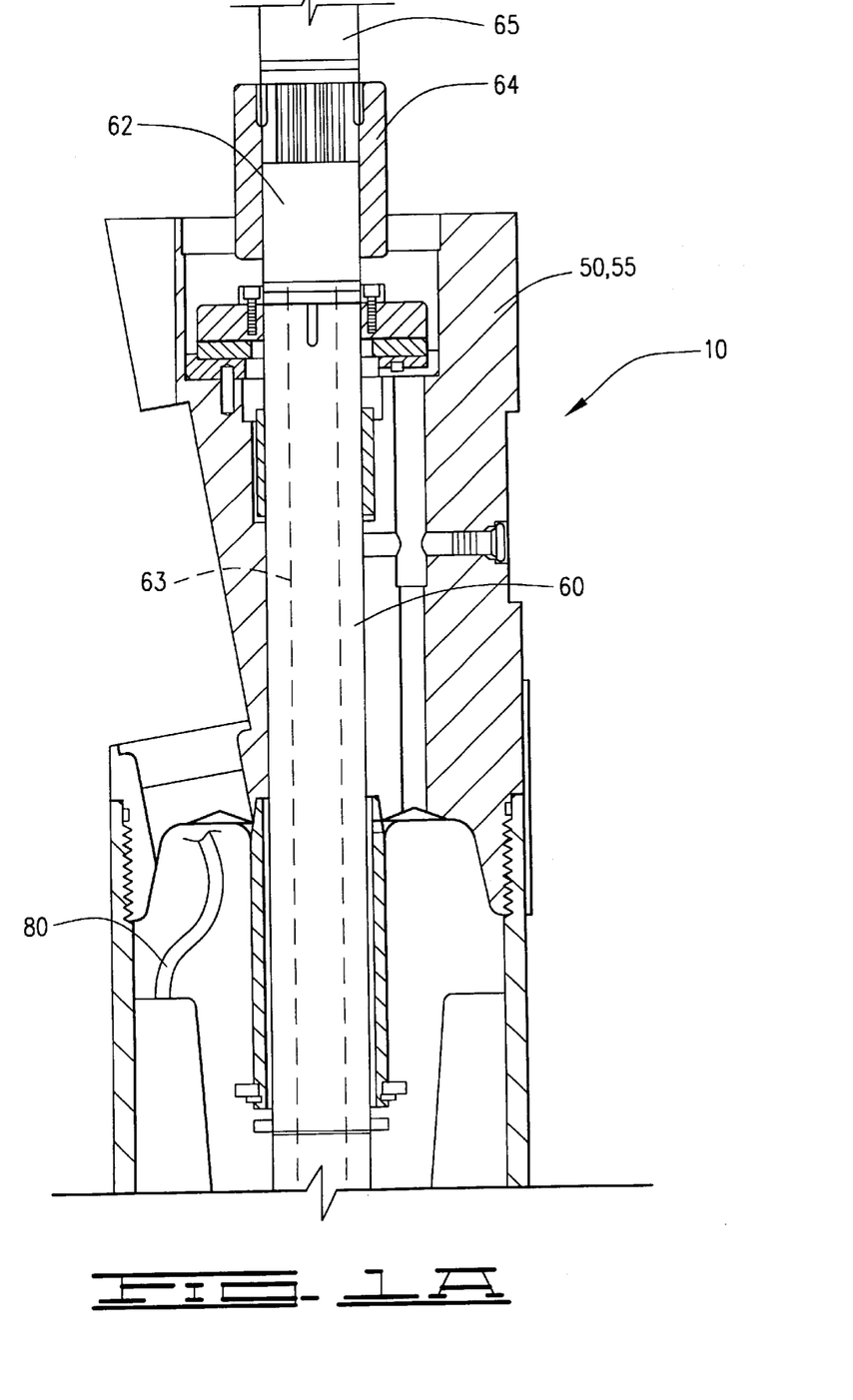
FIGS. 1A–1C show a partial section view of a motor with a bearing of the present invention.
Figure 1B:
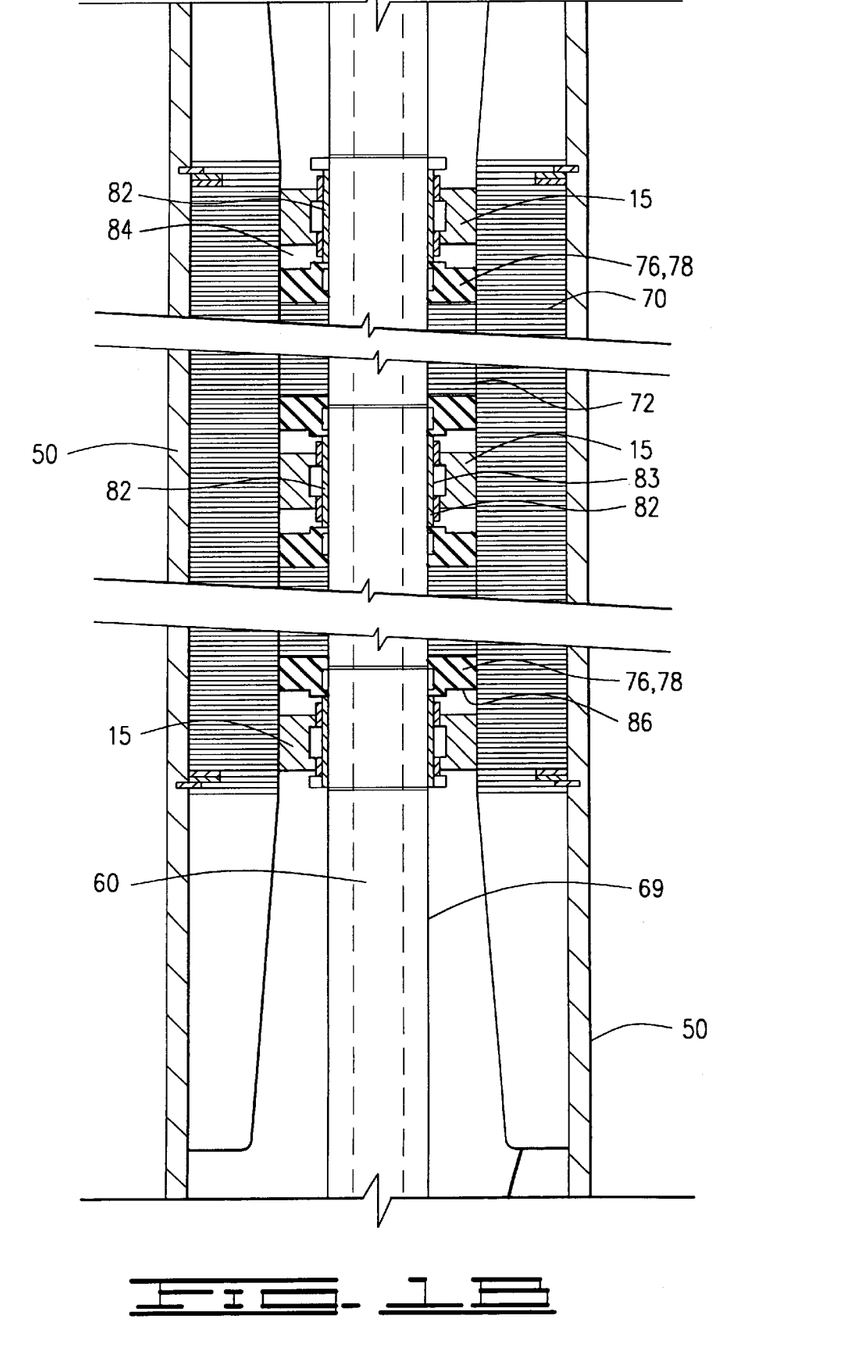
Figure 1C:
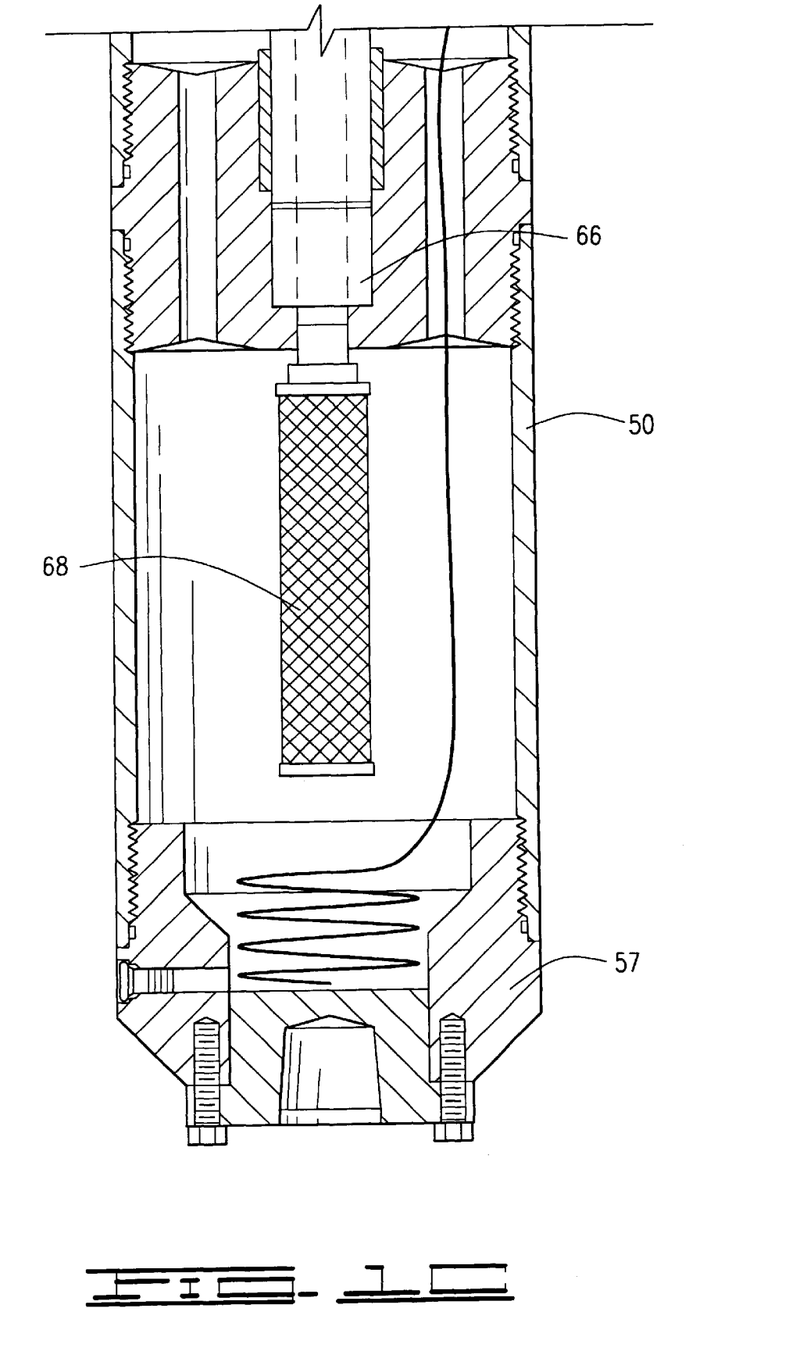
Figure 2:
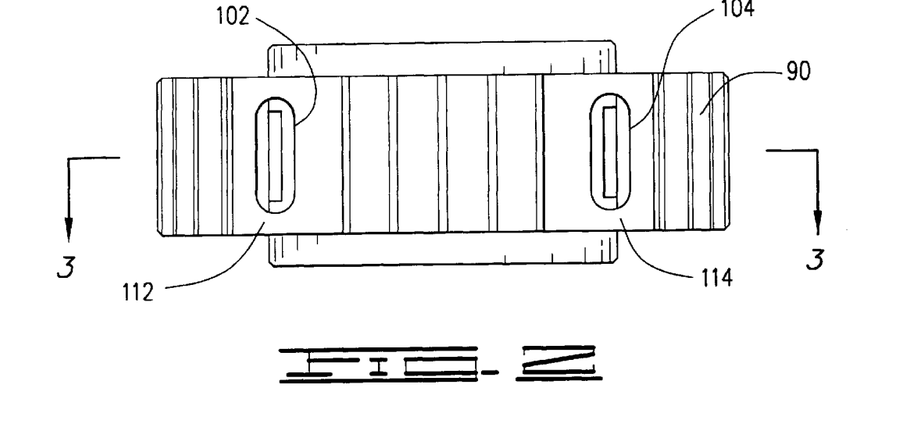
FIG. 2 is a side view of the bearing of the present invention.
Figure 3:
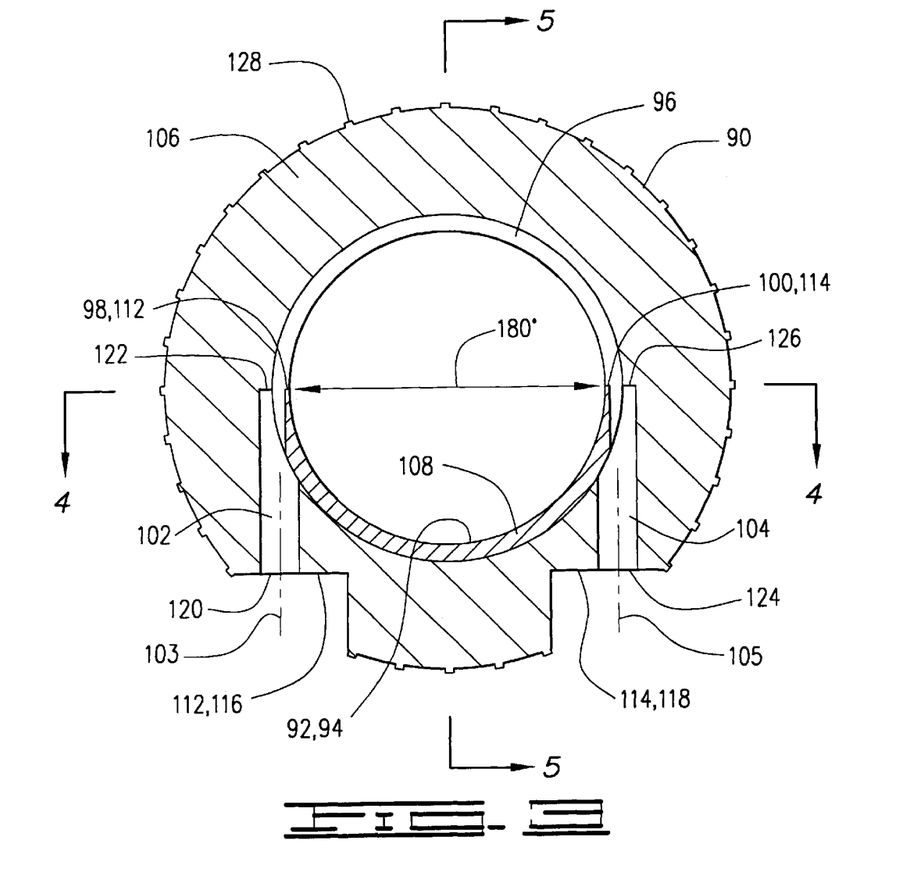
FIG. 3 is a view taken from line 3—3 of FIG. 2.
Figure 4:
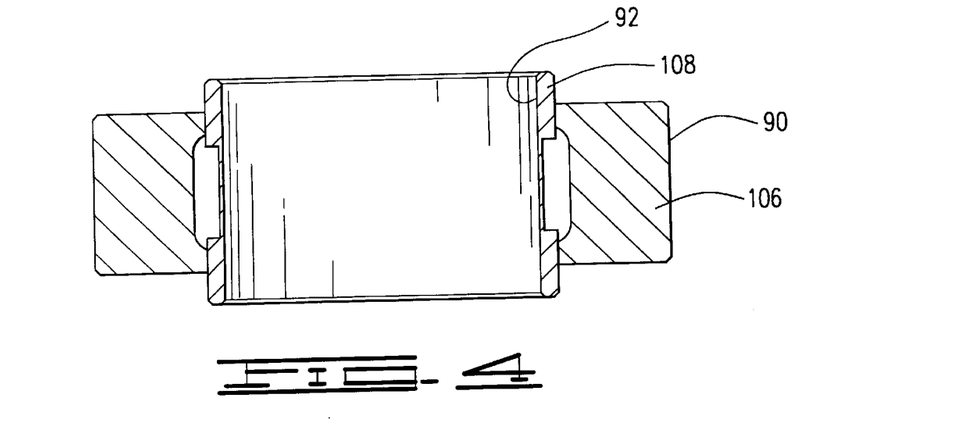
FIG. 4 is a view taken from line 4—4 of FIG. 3.
Figure 5:
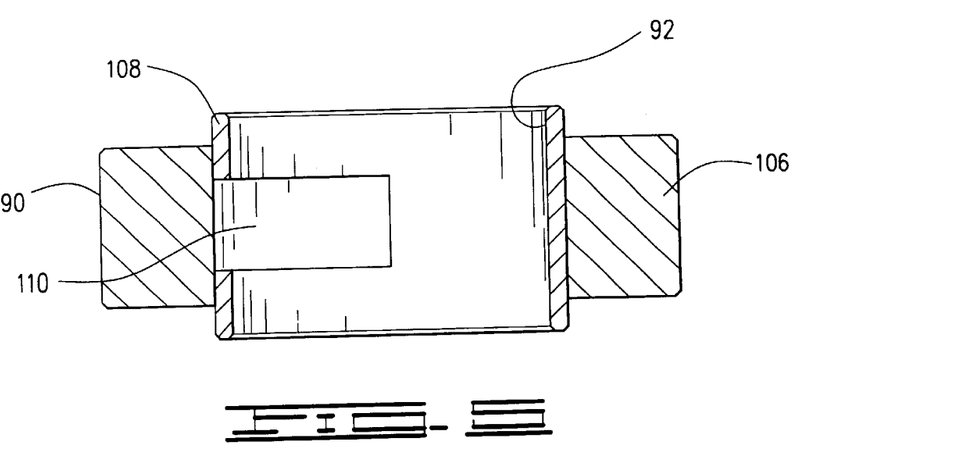
FIG. 5 is a view taken from line 5—5 of FIG. 3.
Figure 6:
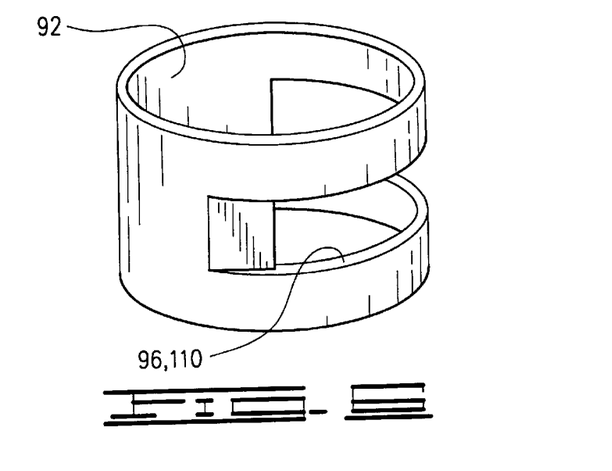
FIG. 6 is a perspective view of the sleeve portion of the bearing of the present invention.
Figure 7:
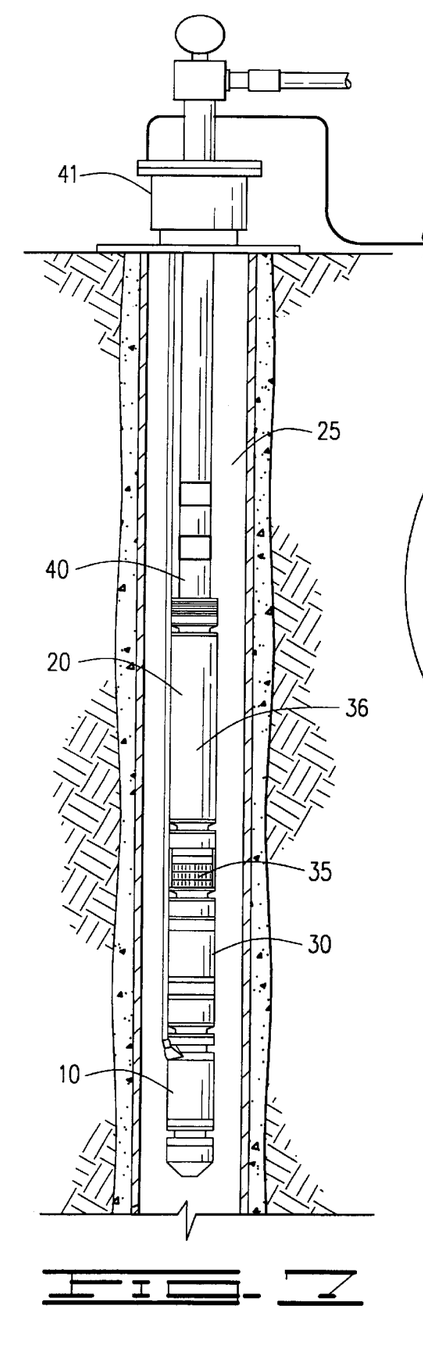
FIG. 7 schematically depicts a tool string disposed in a wellbore.

Referring now to the drawings and more particularly to FIGS. 1A–1C, a motor 10 having a plurality of bearings 15 disposed therein is shown. A tool string 20 including motor 10 is schematically depicted in FIG. 7. As shown therein, tool string 20 is disposed in a wellbore 25 which is drilled for the production of a production fluid such as water or oil. Tool string 20 includes motor 10, a seal section 30, an intake section 35, and a submersible pump 36. Tubing 40 is communicated with pump 36 and extends to a wellhead 41.

Referring now back to FIGS. 1A–1C, motor 10 includes a motor housing 50 which has an upper end or head 55 and a lower end or base 57. Motor housing 50 is at least partially filled with oil, or other lubricating fluid known in the art. Motor 10 has a shaft 60 extending therethrough. Shaft 60 may have a coupling 64 at the upper end 62 thereof, to connect shaft 60 to a shaft 65 which extends upwardly from motor 10 to pump 36. The motor will thus drive pump 36 so that production fluid in the wellbore can be pumped to the wellhead. Shaft 60 disposed in motor housing 50 may have a longitudinal or axial passage 63 extending therethrough. Shaft 60 has a lower end 66 which may have an oil filter 68 connected thereto and has an outer surface 69. The oil in motor housing 50 may be communicated with passage 63 through filter 68.

Figure 8:
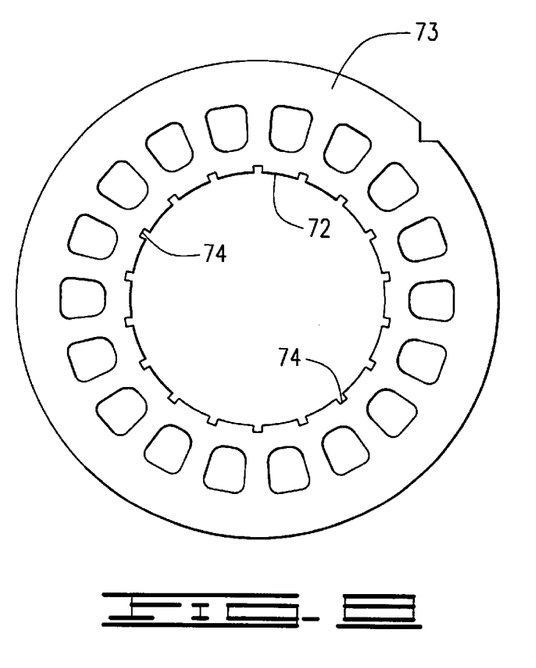
FIG. 8 shows a top view of a stator lamination.

Motor 10 further includes a stator 70 rigidly mounted to housing 50. Stator 70 will normally be made up of a number of flat laminations 73 as depicted in FIG. 8. Stator 70 defines an inner diameter 72 having a plurality of slots 74 uniformly spaced therein in a circular pattern. Motor 10 has a rotor 76 fixed to shaft 60 and is comprised of a plurality of spaced rotor sections 78. An electrical current is directed into stator 70 through a lead cable 80 which is connected to a power source (not shown). The electrical current which passes through stator 70 will cause rotor 76 to rotate thus rotating shaft 60.

As is apparent from FIGS. 1A–1C, motor 10 may include a plurality of bearings 15 disposed about shaft 60 to stabilize the shaft over the length of the motor. Motor 10 may also include a plurality of shaft sleeves 82 disposed about and fixed to shaft 60. Shaft sleeves 82 may be keyed, or otherwise affixed to shaft 60 in any manner known in the art so that shaft sleeve 82 will rotate with shaft 60. A shaft sleeve 82 may be disposed about shaft 60 at each location where a bearing 15 is located, and will be positioned between shaft 60 and bearings 15 so that bearings 15 are disposed about shaft sleeves 82. Shaft sleeves 82 have an outer surface 83.

Bearings 15 are positioned between rotor sections 78 and at the upper and lower ends 84 and 86 thereof. Because the length of motor 10 can vary, the number of rotor sections 78 required to make up rotor 76, along with the number of bearings 15, will vary with the length of the motor. In other words, the greater the length, the greater the number of bearings and rotor sections.

Referring now to FIGS. 2–6, bearing 15 comprises an outer surface 90 and an inner surface 92, which defines an inner diameter 94. Inner surface 92 comprises the bearing surface of the bearing 15. A groove 96 having a first end 98 and a second end 100 is defined in inner surface 92 of bearing 15. First and second ports 102 and 104, respectively, extend through bearing 15 from the outer surface 90 to the inner surface 92 thereof, so that oil in motor housing 50 may be communicated therethrough between outer surface 90 and bearing surface 92 through first and second ports 102 and 104. Thus, first and second ports 102 and 104 comprise an inlet and an outlet for the flow of fluid from the motor housing through bearing 15. First port 102 has a longitudinal axis 103, and second port 104 has a longitudinal axis 105. Axes 103 and 105 are preferably parallel.

Bearing 15 comprises an outer or bearing housing 106 and an inner or bearing sleeve 108. Outer surface 90 is defined on bearing housing 106 and inner or bearing surface 92 is defined on bearing sleeve 108. Bearing sleeve 108 is fixed in housing 106 to prevent rotation of the bearing sleeve therein. A slot 110, which comprises groove 96, is defined through sleeve 108 and has first and second ends 112 and 114. Slot 110 preferably extends between about 170° and 190°, the periphery of sleeve 110 and more preferably extends through about 180°. First and second ports 102 and 104 intersect slot 110, so that ports 102 and 104 and slot 110 comprise a continuous flow path for oil or other lubricating fluid in motor housing 50. Bearing 15 is a generally cylindrically shaped bearing and thus bearing housing 106 is generally cylindrically shaped and has a pair of notches 112 and 114 defined thereon. Port 102 has a first end 120 intersecting flat 116 of notch 112, and has a second end 122. Port 104 has a first end 124 intersecting flat 118 of notch 114, and has a second end 126. Ports 102 and 104 are preferably spaced so that ends 122 and 124 intersect inner diameter 94 about 180° apart. Outer surface 90 has a plurality of outwardly extending ridges 128 defined thereon, which will be received in slots 74 defined in stator 70. Because ridges 128 are received in slots 74, bearing 15 will not rotate in motor housing 50 as shaft 60 rotates.

Ports 102 and 104 will act as an inlet and an outlet through bearing 15. When shaft 60 rotates counterclockwise, port 104 will act as an inlet and port 102 will act as an outlet. Notches 112 and 114 formed in the outer surface of the bearing provide natural reservoirs in motor housing 50. As fluid is drawn into port 104, rotation of the shaft will cause the fluid to flow into slot 110 and to spread out over bearing surface 94 to provide lubrication between shaft sleeve 82 and bearing 15. Oil will be expelled through port 102 so that there is a continuous flow of oil or other fluid into and through the bearing to provide constant lubrication. The continuous flow of oil through bearing 15 results in longer bearing life and provides an economic advantage since the motor housing will have to be disassembled less frequently than motors using prior art bearings. Rotation in a clockwise direction simply changes 102 from an outlet to an inlet and 104 from an inlet to an outlet, and the bearing operates in the manner described herein.

The invention is described as including a shaft sleeve 82, such that the outer surface 83 of sleeve 82 runs on the lubricated inner surface of bearing 15. If desired, the shaft sleeve can be eliminated so that the shaft itself runs on the bearing surface.

The bearing of the present invention may be made of any number of materials used for such components, but is preferably comprised of a stainless steel housing with a bronze inner sleeve. The present invention thus provides for a higher oil flow rate through the bearing than is capable with prior art bearings. The bearing virtually insures a continuous flow of oil and almost eliminates the possibility that a bearing will be starved of oil. Thus, a more efficient, reliable and longer-lasting bearing is provided. The bearing of the present invention is well adapted to be used in any oil-filled material but a preferred application is for use in submersible water well pump and submersible oil pump motors.

Although the invention has been described with reference to a specific embodiment, the foregoing description is not intended to be construed in a limiting sense. Various modifications as well as alternative applications will be suggested to persons skilled in the art by the foregoing specification and illustrations. It is therefore contemplated that the appended claims will cover any such modifications, applications or embodiments that fall within the true scope of the invention.

What is claimed is:

1. A self-lubricating rotor bearing for use in a motor having a motor housing at least partially filled with a lubricating fluid, the bearing comprising:
   a bearing housing adapted to be disposed in said motor housing and to be fixed against rotation therein, said bearing housing defining an inner diameter and having flow ports defined through a side thereof; and
   a bearing sleeve disposed in said bearing housing, said sleeve defining an opening for receiving a rotatable shaft, said opening being defined by an inner surface of said sleeve, said flow ports being communicated with a slot defined through said sleeve so that said lubricating fluid is communicated to the inner surface of said sleeve.

2. The bearing of claim 1, wherein said slot connects said flow ports.

3. The bearing of claim 1, wherein one of said ports is an inlet and the other of said ports is an outlet.

4. The bearing of claim 1, wherein rotation of said shaft during operation of said motor will pull said lubricating fluid from said motor housing into said opening in said sleeve to lubricate a bearing surface of said bearing and will expel said fluid from the other of said flow ports, thereby circulating said fluid through said sleeve.

5. The bearing of claim 1, wherein said slot extends around the circumference of said sleeve through about 170°–190°.

6. The bearing of claim 1, said bearing housing being generally cylindrically shaped, wherein an outer surface of said bearing housing has a flat surface defined thereon intersecting a first end of said ports, said second end of said ports intersecting said slot.

7. The bearing of claim 6, wherein said flat surfaces define a fluid reservoir in said motor housing.

8. The bearing of claim 1, wherein said sleeve has a slot therethrough so that said lubricating fluid is communicated to the inner surface of said sleeve through said ports and said slot.

9. The bearing of claim 8, wherein said slot connects said flow ports.

10. The bearing of claim 9, wherein rotation of said shaft during operation of said motor will pull said lubricating fluid from said motor housing into said opening in said sleeve to lubricate a bearing surface of said bearing and will expel said fluid from the other of said flow ports, thereby circulating said fluid through said sleeve.

11. It A submersible motor comprising:
   a motor housing filled with oil;
   a rotatable shaft disposed in said motor housing;
   a rotor disposed about said rotatable shaft in said motor housing;
   a stator disposed about said rotor;
   a rotor bearing disposed about said rotatable shaft, said rotor bearing having an inner surface defining a bearing surface and having an outer surface, said rotor bearing defining a flow path having an inlet for the intake of oil from said housing through said rotor bearing to said surface and an outlet for the expulsion of oil into said motor housing from said bearing; and
   a shaft sleeve disposed about said shaft and fixed thereto between said rotor bearing and said shaft.

12. The motor of claim 11, the bearing having a groove defined in said inner surface wherein said inlet and said outlet intersect said groove.

13. The motor of claim 12 wherein said groove extends around about 170° to 190° of the inner diameter of said bearing.

14. The motor of claim 12, said bearing comprising:
   a bearing outer housing, said outer housing being adapted to engage said stator to prevent rotation of said bearing; and
   a bearing sleeve disposed in said outer housing, said inner surface of said bearing being defined by said inner sleeve.

15. The motor of claim 14, said groove comprising a slot defined through said bearing sleeve wherein said inlet and said outlet are connected to one another by said slot.

16. The motor of claim 15, said bearing having a generally cylindrical outer surface having notches defined therein, wherein said inlet and said outlet intersect said notches.

17. The apparatus of claim 16, wherein each said notch defines a flat surface intersecting said first and second ports.

18. The apparatus of claim 12, said bearing comprising a generally cylindrical shape, said inlet and outlet comprising first and second flow ports defined through said bearing to communicate said inner surface of said bearing with an opening defined by said motor housing, said first and second ports intersecting said first and second notches.

19. The apparatus of claim 10, said inlet and outlet having a first longitudinal axis and a second longitudinal axis, respectively, said first and second longitudinal axes being substantially parallel.

20. A self-lubricating rotor bearing for use in a motor having a motor housing at least partially filled with a lubricating fluid, the bearing comprising:
   a bearing housing adapted to be disposed in said motor housing and to be fixed against rotation therein, said bearing housing defining an inner diameter and having flow ports defined through a side thereof;
   a bearing sleeve disposed in said bearing housing, said sleeve defining an opening for receiving a rotatable shaft, said opening being defined by an inner surface of said sleeve;
   means for communicating said lubricating fluid from said motor housing with an inner surface of said bearing sleeve; and
   said bearing having a plurality of ridges defined by the outer surface thereof for engaging grooves defined by a stator section of said motor to prevent rotation of said bearing in said motor housing.

21. A self-lubricating rotor bearing for use in a motor having a motor housing at least partially filled with a lubricating fluid, the bearing comprising:
   a bearing housing adapted to be disposed in said motor housing and to be fixed against rotation therein, said bearing housing defining an inner diameter and having flow ports defined through a side thereof;
   a bearing sleeve disposed in said bearing housing, said sleeve defining an opening for receiving a rotatable shaft, said opening being defined by an inner surface of said sleeve wherein said flow ports communicate said lubricating fluid to an inner surface of said bearing sleeve.

22. A submersible motor comprising:

a motor housing filled with oil;

a rotatable shaft disposed in said motor housing;

a rotor disposed about said rotatable shaft in said motor housing;

a stator disposed about said rotor; and a rotor bearing disposed about said rotatable shaft, said rotor bearing having an inner surface defining a bearing surface and having an outer surface, said rotor bearing defining a flow path having an inlet for the intake of oil from said housing through said rotor bearing to said bearing surface and an outlet for the expulsion of oil into said motor housing from said bearing.

23. The motor of claim 22, wherein said flow path comprises an inlet port and an outlet port defined through a side of said bearing, wherein rotation of said shaft bearing causes fluid to be pulled into said bearing through said inlet port to lubricate said bearing surface and causes said fluid to be expelled into said motor housing through said outlet port.

* * * * *

UNITED STATES PATENT AND TRADEMARK OFFICE
CERTIFICATE OF CORRECTION

PATENT NO. : 6,225,720 B1
DATED : May 1, 2001
INVENTOR(S) : Girma G. Desta

It is certified that error appears in the above-identified patent and that said Letters Patent is hereby corrected as shown below:

Claim 11,
Line 1, delete "It."

Column 6,
Line 2, insert -- bearing -- before "surface."

Claim 19,
Should be dependent from claim 11.

Signed and Sealed this

Twenty-Seventh Day of November, 2001

Attest:

NICHOLAS P. GODICI
Attesting Officer
Acting Director of the United States Patent and Trademark Office